April 23, 1935. C. A. BULKELEY 1,998,774
PROCESS FOR PURIFICATION OF FLUIDS
Filed Jan. 19, 1931 3 Sheets-Sheet 1
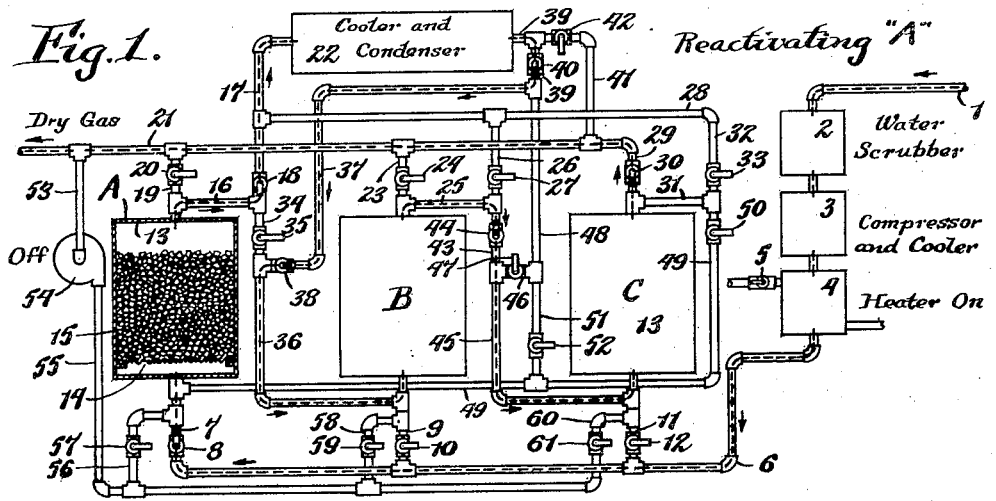
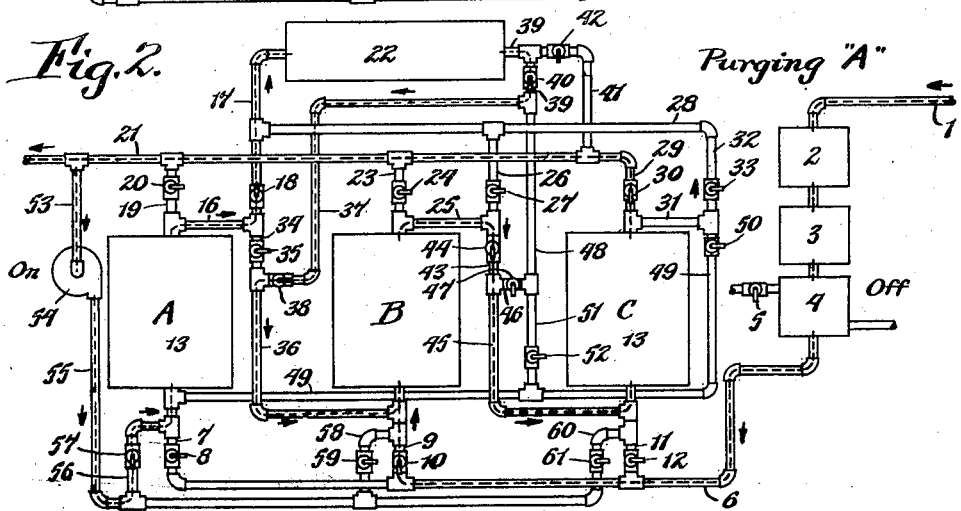
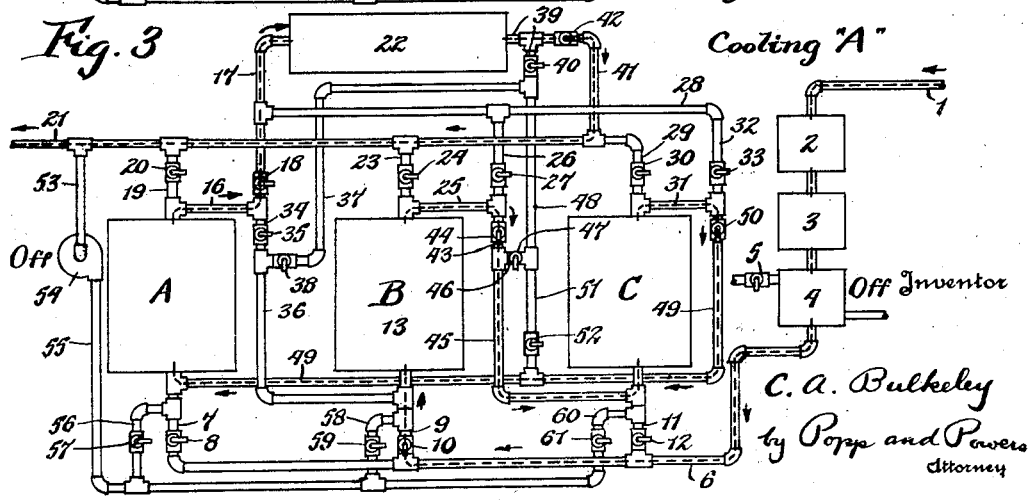

April 23, 1935.    C. A. BULKELEY    1,998,774
PROCESS FOR PURIFICATION OF FLUIDS
Filed Jan. 19, 1931    3 Sheets-Sheet 2
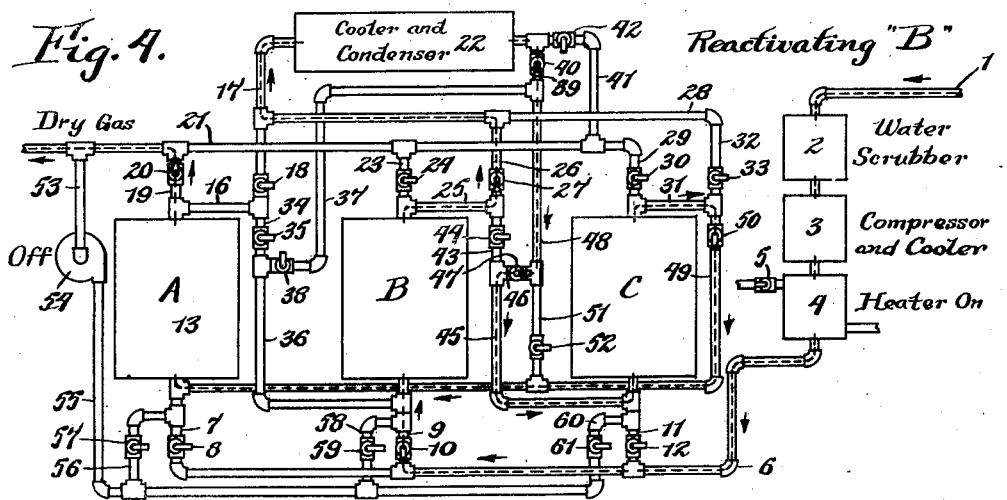
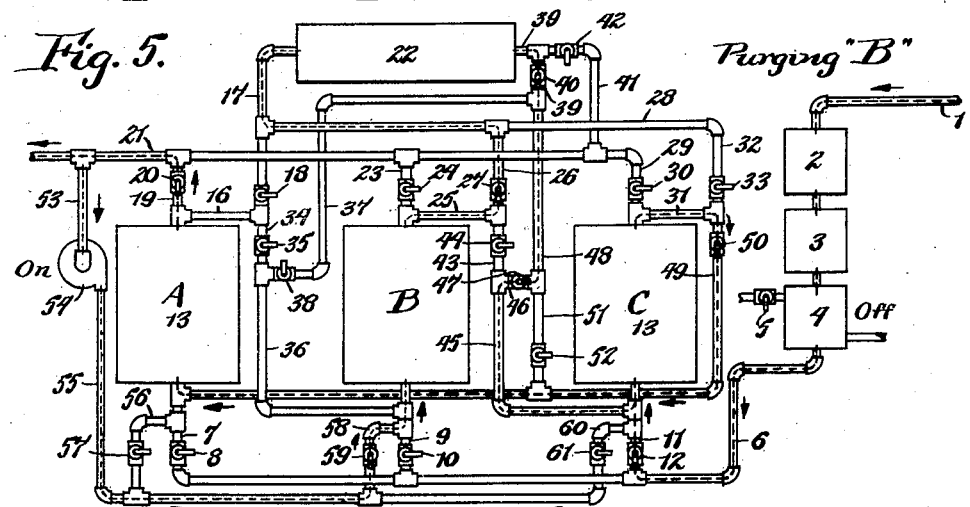
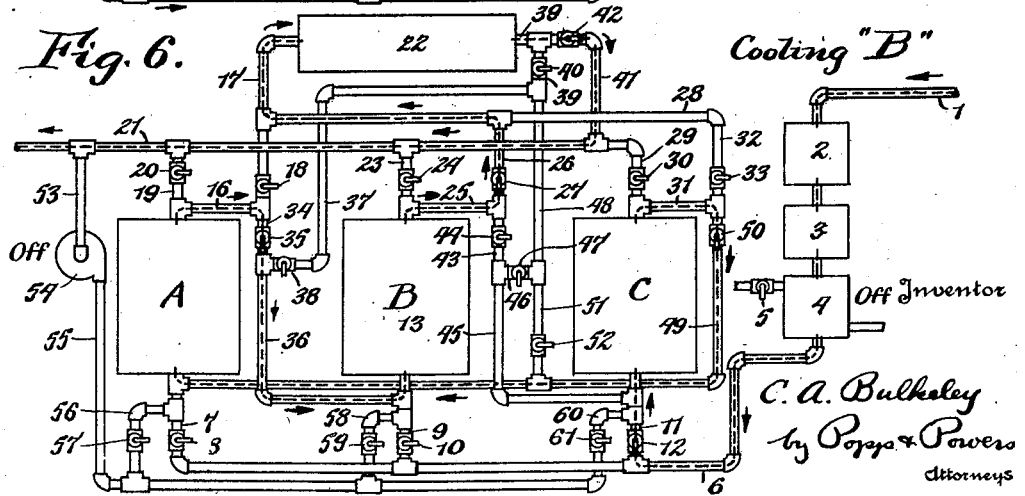

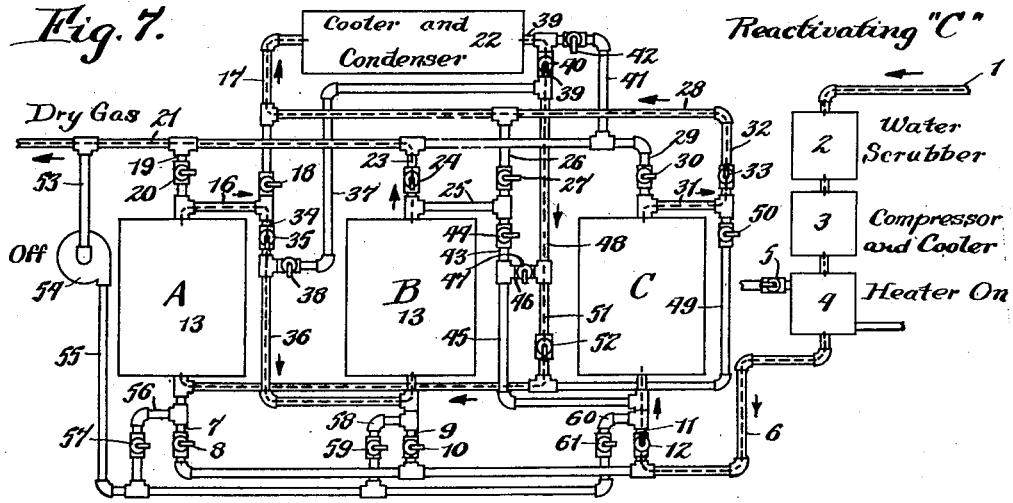
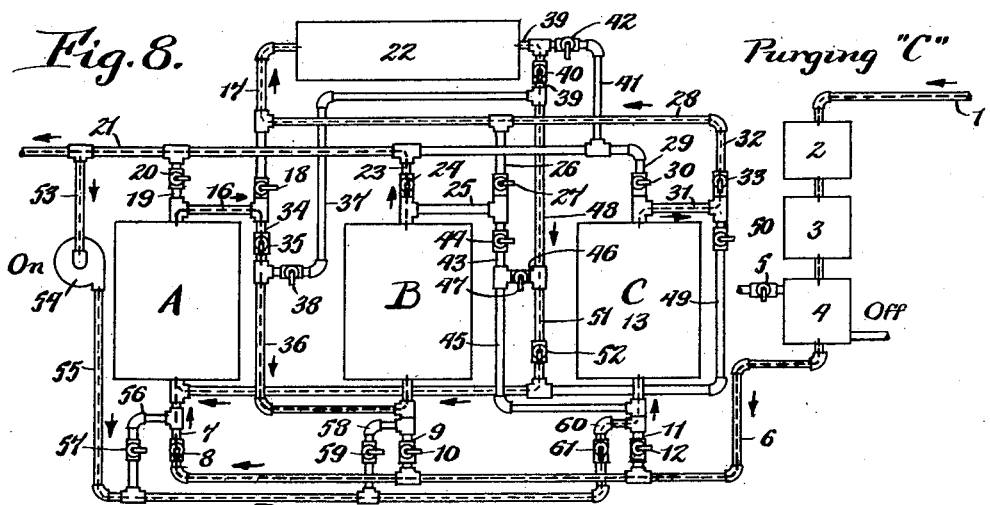
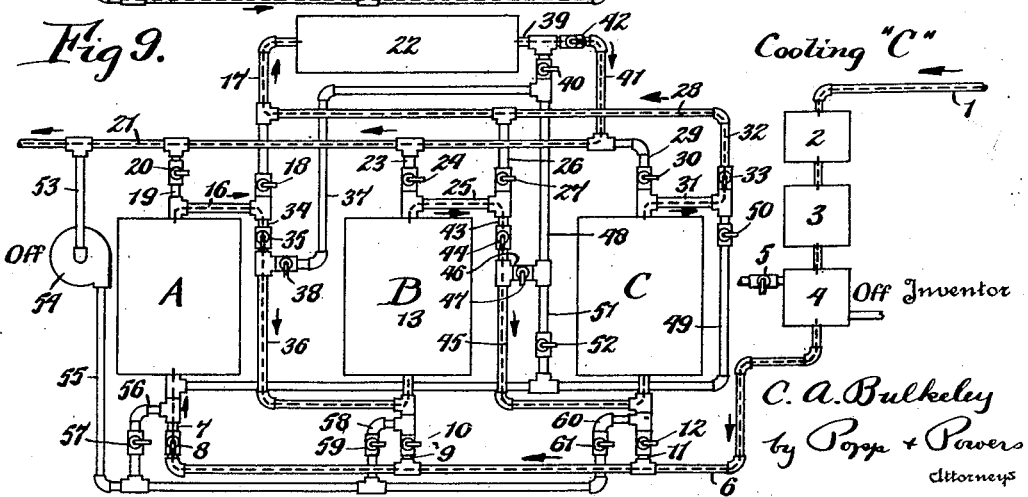

Patented Apr. 23, 1935

1,998,774

UNITED STATES PATENT OFFICE 1,998,774

PROCESS FOR PURIFICATION OF FLUIDS

Claude A. Bulkeley, Buffalo, N. Y., assignor, by mesne assignments, to Chester F. Hockley, receiver of The Silica Gel Corporation Application January 19, 1931, Serial No. 509,570

13 Claims. (Cl. 183—4)

This invention relates to a process for the purification of fluids by adsorption and more particularly to the dehydration of carbon dioxide in a uniform stream of continuous volume by adsorption in an adsorbent or absorbent.

Many gases, such as carbon dioxide, hydrogen, oxygen, air, etc. contain certain foreign impurities, such as water vapor, for example, which must be entirely removed before the gas can be successfully used in later processes. Particularly is this true of carbon dioxide where the carbon dioxide is processed by compression into solid form or carbon dioxide ice for use as a refrigerant. This carbon dioxide before it is compressed in the final stage must be dehydrated completely. As the dehydrated carbon dioxide gas is fed to the final stages of compression it must be supplied in a continuous steady volume or rate of flow. Also since the gas has a value, none of it should be needlessly wasted and there must be no opportunity or chance for any of the undehydrated carbon dioxide to by-pass the dehydration process and thus contaminate the dry gas fed to the final stages of compression.

One of the principal objects of this invention is to provide a system in which the operation of absorbing the impurities from the fluid to be purified is carried on by partly spent and a fresh or reactivated adsorber in series and while the spent adsorber is being reactivated and purged. By such a system and by reactivating and purging the adsorbers in succession the purification proceeds as a continuous process.

Another purpose is to provide such a process and apparatus which will handle large volumes of gas and provide a stream of purified gas of constant volume, this being particularly required in the manufacture of solid carbon dioxide ice.

A further purpose is to provide such a process and system which produces thoroughly purified gas or other fluid and in which there is no danger of contaminating the gas through the reactivating and purging of the absorbent, which reactivating and purging is necessary for continuous processing.

A still further aim is to provide such a system which operates at extremely low cost in point of heat consumption and the power necessary to force the fluid through the system and in which also the system can be erected and installed at very low cost and can be made of standard parts.

Another object is to provide such a system which will permit of the use of low cost adsorbents, such as activated alumina, and such adsorbents which require frequent revivification.

Another object is to effect all the necessary phases of reactivating, purging and cooling by means of gas handled by the system, thereby providing an entirely closed system and avoiding loss or contamination of the gas as well as eliminating the necessity of providing extra equipment to handle another medium.

Another purpose is to avoid the use of jacketed adsorbers or adsorbers which require special coils or other special fittings for their proper operation.

A further aim is to compress and cool the wet or impure gas before processing thereby reducing its volume and condensing out the moisture, in inverse proportion. The removal of the bulk of the moisture requires less work to be done by the adsorbers and the reduction in the volume permits of a reduction in the size of the adsorbers and the piping, smaller piping carrying the increased weight of the gas under high compression with very little more friction than the large piping which would be required to handle an equal weight of gas under no compression.

Other purposes are to provide such a system which is relatively compact and simple in its construction thereby rendering it easy to clean and repair and also to provide such a system which can be operated with minimum attention and skill on the part of the operator.

In the present application, for the purpose of illustration only, it has been assumed that the processes carried on is the dehydrating of carbon dioxide with the use of activated alumina as an adsorbent, activated alumina being a relatively inexpensive adsorbent for this purpose. It is to be understood, however, that the processing of carbon dioxide and also the use of activated alumina is by way of example only and that the invention can be embodied in a system for processing any fluid from which it is desired to remove any impurity by passing the fluid in contact with any adsorptive or absorptive material in the manner herein described and shown as applied to the dehydration of carbon dioxide.

Activated alumina, and like adsorbents, is usually in granular form and screened to certain minimum and maximum sizes, these granulations having been prepared by crushing and screening. This granulated, activated alumina is an adsorbent of water vapor, when it is mixed with any otherwise relatively inert gas, such as carbon dioxide and when this carbon dioxide containing water vapor is passed through a bed of activated alumina. After the moist carbon dioxide gas has been passed through such a bed of activated alumina, the activated alumina becomes loaded with condensed water vapor progressively beginning at the entrance side of the bed. When the major portion of the bed has been loaded or charged with the water up to or near its capacity to act as an adsorber, the adsorbent must be taken out of service and be put through a process known as reactivation. This reactivation consists of passing relatively hot gas at say from 300° to 400° F. through the bed. This hot gas volatilizes the water of the adsorbent bed until it is as free from moisture as before it had been used as an adsorbent.

After this reactivating process has been completed the adsorbent is both hot and dry. While hot it will not act as an adsorbent but must be cooled down to its original temperature of approximately 100° F. This can be most easily accomplished by passing cool gas through the bed.

Since in most cases the dehydrating process must be continuous, it becomes necessary to provide at least three independent beds of adsorbent. The three beds, according to the preesnt invention, are rotated in point of position in the process so that the three beds are reactivated and cooled in rotative order, always having two beds arranged so that the gas to be purified passes through them in series. With three beds the present method of operation results in three periods of time of equal duration which make up a complete cycle of operations. During each of the three periods one of each of the three beds is being reactivated and cooled with the other two beds in series and acting as adsorbers of the impurities in the gas. The gas is always first passed through the bed which was in service during the previous period and from this bed the gas passes through the next bed which was reactivated during the previous period. Thus the final stage of dehydration is always accomplished by the more recently reactivated bed. This tends to more thorough dehydration and permits the first bed on the line to be more nearly loaded to full capacity since a lack in 100% dehydration of the gas in this first bed will be made up for by the subsequent passing of the gas through the final bed which has been more recently reactivated.

In the accompanying drawings all of the figures represent the same system, the several figures being merely flow sheets illustrating the flow of gas during the nine operations which complete a cycle.

Figs. 1–3 illustrate the flow of the gas during the first period, in which in Fig. 1 the absorber A is being reactivated; in Fig. 2 this absorber A is being purged; and in Fig. 3 this absorber A is being cooled.

Figs. 4–6 illustrate the second period of operation composed of three operations in which in Fig. 4 the absorber B is being reactivated; in Fig. 5 this absorber B is being purged; and in Fig. 6 this absorber B is being cooled.

Figs. 7–9 illustrate the third period of operation composed of three operations in which in Fig. 7 the absorber C is being reactivated; in Fig. 8 this absorber C is being purged; and in Fig. 9 this absorber C is being cooled.

The system requires the manipulation of a number of valves and for convenience in understanding the operation of this system it has been assumed that when the handle of a valve is arranged parallel with the line in which it is placed that the valve is opened and when this handle is arranged at right angles to its line the valve is closed.

The gas, such as carbon dioxide, with a water content, is obtained from a supply line 1, preferably passes through a water scrubber 2, a compressor and after cooler 3 and a heater 4. The compressor and after cooler 3 are not essential but are highly desirable since the compression of wet carbon dioxide gas will result in the condensation of the bulk of its water content and also permits of the use of smaller distributing piping than if the gas were carried through the system under low pressure. The heater 4 is shown as heated by steam which is controlled by a steam supply valve 5.

From the heater 4 the unprocessed carbon dioxide gas passes into a pipe 6 which has three branches, one branch 7 containing a valve 8 and leading to the absorber A; the second branch 9 having a valve 10 leading to the absorber B; and the third branch 11 having a valve 12 leading to the absorber C. Each of these absorbers is alike in construction and is shown as comprising an enclosed cylinder 13 having an inlet at its bottom which is connected to the corresponding branch 7, 9 or 11 and having an outlet at its top. In the bottom of each shell 13 a screen 14 is supported in spaced relation to the bottom of the seal and on this screen 14 is supported a bed or granular adsorbent or absorbent material, such as activated alumina. The absorber A has its outlet connected by a line 16 with a line 17 containing a valve 18, and this outlet of the absorber A is also connected by a line 19 containing a valve 20 with the dry or purified gas outlet line 21. The line 17 connects with a cooler and condenser 22 which can be of any suitable construction.

The outlet of the absorber B is connected by a line 23 having a valve 24 with the dry or pure gas outlet line 21 and is also connected by a line 25 with a line 26 containing a valve 27. This line 26 connects with a line 28 which in turn is connected to the line 17 leading to the cooler and condenser 22.

The outlet of the absorber C is likewise connected by a branch 29 having a valve 30 with the dry gas outlet line 21 and by a branch 31 with a line 32 having a valve 33, this line 32 connecting with the pipe 28 which connects with the line 17 and the cooler and condenser 22.

The outlet line 16 of the absorber A is also connected to a line 34 having a valve 35, this line 34 connecting with a pipe 36 which communicates with the inlet of absorber B. The line 34 also connects with a line 37 having a valve 38, this line 37 connecting with a line 39 having a valve 40, this line 39 connecting with the opposite end of the cooler and condenser 22. This line 39 connected with the opposite end of the cooler and condenser 22 is also connected by a line 41 containing a valve 42 with the dry or purified gas outlet line 21.

The outlet line 25 of the absorber B also connects with a line 43 having a valve 44 with a line 45 leading to the inlet of the absorber C. The line 43 is also connected by a line 46 containing a valve 47 with a line 48 connected with the valve line 39 leading to the cooler and condenser 22.

The outlet branch line 31 of the absorber C also connects with a line 49 having a valve 50, this line 49 connecting with the inlet of the absorber A and also being connected by a branch line 51 containing a valve 52 with the lines 46 and 48. In order to purge each absorber after it has been revivified, purified gas is repassed through such absorber and for this purpose a line 53 connects with the inlet of a pump 54, the outlet of which connects with a line 55. This purging gas line 55 has a branch 56 containing a valve 57, which branch connects it with the inlet of the absorber A and also has a branch 58 having a valve 59 which connects it with the inlet of the absorber B and also has a branch 60 having a valve 61 which connects it with the inlet of the absorber C.

Operation

With the above system, and assuming that the object is to dehydrate carbon dioxide, the operation is as follows:

The complete cycle of operations is divided into three periods of equal duration: in one period the absorber A being reactivated, purged and cooled; in the second period the absorber B being reactivated, purged and cooled; and in the third period the absorber C being reactivated, purged and cooled.

First Period

*First operation of reactivating absorber A—Fig. 1*

During this operation it has been assumed that the absorber A has been completely saturated with moisture and is practically dead, the absorber B is partly spent and the absorber C is entirely fresh. It is therefore necessary to reactivate the absorber A. In this condition of operation the steam supply valve 5 is open and consequently steam is passing through the heater 4. When therefore the moist carbon dioxide gas entering through the supply line 1, water scrubber 2 and compressor and after cooler 3 leaves the heater 4 it is heated to from 300° to 400° F. This hot carbon dioxide gas passes through the line 6, valve 8 and line 7 into the inlet of the absorber A and up through the bed of granulated alumina 15. At this high temperature the carbon dioxide gas drives out the water in the granular alumina 15, this water being carried out with the gas through the line 16, valve 18 and line 17 to the cooler and condenser 22. In the cooler and condenser the temperature of the gas is lowered sufficiently to condense out all of the water driven out of the alumina 15 in the absorber A. The gas with the greater part of its water condensed out leaves the cooler and condenser 22 through the line 39, valve 40, line 37, valve 38 and line 36 into the bottom of the partly spent absorber B. In passing up through the activated alumina of the absorber B the greater part of its remaining water content is absorbed by the partially spent activated alumina therein and the gas passes out from the absorber B through the line 25 and thence through the line 43, valve 44, to the line 45 which conducts it to the bottom of the fresh absorber C. In passing up through the fresher reactivated alumina in the absorber C any water remaining in the gas is adsorbed and the dry, purified gas passes out through the line 29 and valve 30 into the dry gas outlet line 21.

*Second operation purging absorber A—Fig. 2*

All the moisture has been taken out of the granular adsorbent in absorber A and to place it in operation the next required step is that the absorber A and its outlet pipe connections be purged of any carbon dioxide gas which is not entirely dry or purified since in the further carrying on of the process it is highly desirable that this absorber be the final absorber through which the gas is passed to remove the last traces of moisture or impurities. During this operation which occupies a very small amount of time as compared with the other operations the heater 4 is turned off and the moist carbon dioxide gas from the line 1 passes through the scrubber 2, compressor and after cooler 3, heater 4, line 6, valve 10 and line 9 into the lower end of absorber B. In the partly spent absorber B a part of the water content is removed and the partly dry carbon dioxide gas passes out through the line 25, line 43, valve 44 and line 45 into the bottom of the fresh absorber C. In passing through the relatively freshly activated granular adsorbent in the absorber C the remaining water content of the gas is removed and the dry, purified gas passes out through the line 29, valve 30 into the dry gas outlet line 21. To purge the absorber A during this operation the blower 54 is turned on and this blower draws dry gas from the dry gas outlet line 21 through the line 53 and discharges it into the line 55 from which it is conducted through the absorber A by the branch 56 containing the valve 57. This dry and purified gas drives any remaining impure or partly water-laden carbon dioxide from the absorber A out through the line 16, valve 18, line 17, cooler and condenser 22, line 39, valve 40, line 37, valve 38, line 36, into the inlet of the absorber B where it joins the raw gas entering this absorber from the gas supply line 1. This operation is continued until all impure gas is driven out of the absorber A and out of the piping system through which a part of the purified, dry gas is by-passed by the blower 54. It will be noted that the purging gas is cooled before entering the adsorber to be purged thereby not only purging the adsorber but also cooling it to some extent.

*Third operation cooling absorber A—Fig. 3*

A very small amount of pure, dry gas is withdrawn from the pure, dry gas outlet line 21 to purge absorber A and the associated piping and consequently it is necessary to have a large volume of cool gas to cool absorber A from its high temperature of from 300° to 400° F. to 100° F. since activated alumina will not absorb moisture except at a relatively low temperature. Therefore to cool absorber A the steam supply to the heater 4 is continued to be cut off and the purging fan is also turned off. In this condition of the apparatus and with the line valves suitably arranged the gas enters from the supply line 1, through the water scrubber 2, compressor and after cooler 3, heater 4, line 6, valve 10, and line 9 and enters the bottom of the absorber B. The partly spent alumina in the absorber B absorbs the greater part of the water and the partly dried carbon dioxide passes out of the absorber B through the line 25, line 43, valve 44, and line 45 into the bottom of the fresher absorber C. In this absorber any remaining traces of moisture are absorbed from the gas and this gas passes out from the absorber C through the line 31, valve 50 and line 49 into the inlet of hot absorber A. This dry gas in passing through the hot activated alumina 15 in the absorber A cools it down, the alumina cooling progressively from the bottom or entrance side to the top. As soon as this cooling process starts the bottom of the activated alumina in absorber A immediately becomes an effective adsorbent, should there be any traces of moisture in the carbon dioxide leaving the absorber C. The gas leaving the absorber A is, of course, hot although dry and pure and passes through the line 16, valve 18 and line 17 to the cooler and condenser 22 where it is cooled and leaves through the line 39, line 41, valve 42, and passes out through the dry gas outlet line 21.

SECOND PERIOD

*Fourth operation reactivating absorber B—Fig. 4*

The absorber A is now entirely reactivated and cooled whereas the absorber B is entirely spent and the absorber C is partly spent. It is therefore necessary to reactivate absorber B. As shown in Fig. 4 during this operation the heater 4 is turned on and the carbon dioxide gas entering from the line 1, water scrubber 2, and compressor and after cooler 3 is heated to from 300° to 400° F. in the heater 4 and passes out through the line 6. From this line it passes through the branch line 9 and valve 10 into the bottom of the absorber B and in passing through the spent alumina 15 therein drives out the moisture from the activated alumina, this hot, moist gas passing out through the line 25, valve 27, line 26, line 28 and line 17 into the cooler and condenser 22. In this cooler and condenser the hot, wet gas is cooled down and a great part of its water is condensed out, the water condensed out being the water adsorbed from the activated alumina in passing through the spent absorber B. The carbon dioxide gas then passes through line 39, valve 40, line 48, line 46, valve 47 and line 45 into the bottom of the partly spent absorber C. In passing through the activated alumina in this partly spent absorber C the greater part of the remaining water content is absorbed by the activated alumina and the partly dried gas passes out through the line 31, valve 49, valve 50 into the bottom of the fresh or just previously reactivated absorber A. In passing through the freshly reactivated alumina in absorber A its remaining water content is removed and the completely dried and purified gas passes from the absorber A through the branch 19 and valve 20 directly to the dry gas outlet line 21.

*Fifth operation purging absorber B—Fig. 5*

As soon as the water content has been driven out of the activated alumina in the absorber B this absorber and its outlet lines are purged of any remaining partly moist gas since it is necessary to use this absorber B as the final drying absorber in the next succeeding operation. For this operation the heater 4 is turned off and the carbon dioxide gas enters from the supply line 1, water scrubber 2, compressor and after cooler 3, heater 4, line 6, and branch line 11 and valve 12 into the bottom of the partly spent absorber C. In this absorber the greater part of the water is adsorbed and the partly dried gas passes out from this absorber through the line 31, valve 50 and line 49 into the bottom of the fresher absorber A. The alumina in this absorber A has just been reactivated and consequently any remaining traces of water are removed or adsorbed therein and the dry, purified carbon dioxide passes out through the branch line 19 and valve 20 into the dry gas outlet line 21.

During this operation the fan 54 is turned on and a small portion of the dry gas flowing out through the dry gas outlet line 21 is withdrawn through the line 53 and discharged into the line 55 from which it passes through the branch 58 and valve 59 into the inlet of absorber B. The dry gas passes through the absorber B and purges it of any remaining moisture-laden gas, this moisture-laden gas being driven out from the absorber B through the line 25, valve 27, line 26 and line 17 into the cooler and condenser 22. From this cooler and condenser 22 the purging gas passes through the line 39, valve 40, line 48, line 46, valve 47 and line 45 into the inlet of the absorber C where it joins the incoming unprocessed gas and passes through the system as just described.

*Sixth operation cooling absorber B—Fig. 6*

The adsorbent in absorber B is now completely reactivated but it is too hot to act as an absorber therefore the blower 54 is turned off and valves in the system suitably manipulated so that the carbon dioxide from inlet line 1, water scrubber 2, compressor and after cooler 3, heater 4 and line 6 passes through branch line 11 and valve 12 into the bottom of the partly spent absorber C. The adsorbent in partly spent absorber C adsorbs the greater part of the water content of the gas and the partly dried gas passes out through line 31, valve 50 and line 49 into the bottom of the freshest absorber A. In passing through the alumina in absorber A any remaining traces of water are removed from the carbon dioxide and the pure and dry carbon dioxide passes through the line 16, line 34, valve 35, and line 36 into the bottom of absorber B. In passing through the hot adsorbent in absorber B it cools the adsorbent until it is at a proper temperature to act in adsorbing and the gas is, of course, heated. This hot, dry gas passes from the absorber B through line 25, valve 27, line 26 and line 17 into the cooler and condenser. In this cooler and condenser it is cooled down and the cool and pure gas leaves through the line 39, valve 42 and line 41 which conducts it to the dry gas outlet line 21.

THIRD PERIOD

*Seventh operation reactivating absorber C—Fig. 7*

At the end of the second period the absorber A is partly spent, the absorber B has just been reactivated, and is fresh and the absorber C is entirely spent. The heater 4 is therefore turned on and the carbon dioxide entering the supply line 1 through the water scrubber 2 and compressor and after cooler 3 is raised to from 300° to 400° F. in the heater 4 and passes through the line 6, valve 12 and branch 11 to the bottom of the spent absorber C. This hot gas in passing up through the granular adsorbent in absorber C drives off the moisture therein and the hot, moist carbon dioxide passes up through the line 31, valve 33, line 32, 28 and 17 into the cooler and condenser 22 where all the moisture absorbed from the granular adsorbent is condensed out of the gas. The partly dried gas thereupon passes out through the branch 39, valve 40, line 48, line 51, valve 52 and line 49 into the bottom of the partly spent absorber A. In the absorber A the greater part of the moisture from the gas is absorbed by the activated alumina and the partly dried carbon dioxide gas passes out through the line 16, line 34, valve 35 and line 36 to the bottom of the fresh absorber B. In passing out through the freshly reactivated adsorbent in the absorber B any remaining traces of water are adsorbed from the gas and the dry and purified gas passes out through the line 23 and valve 24 directly to the dry and pure gas outlet line 21.

*Eighth operation purging absorber C—Fig. 8*

After all the moisture has been driven out of absorber C it is necessary to purge it of any wet gas remaining in it or its outlet lines. For this purpose the heater 4 is turned off and the blower 54 is turned on and the valves are so adjusted that the gas entering through the inlet line 1, water scrubber 2, compressor and after cooler 3, heater 4 and line 6 passes through the valve 8 and branch 7 into the partly spent absorber A. In passing through the activated alumina 15 in this absorber the greater part of the moisture or impurities in the gas are taken out and the partly dried gas passes through the line 16, line 34, valve 35 and line 36 into the bottom of the freshly reactivated absorber B. The freshly reactivated alumina in this absorber B adsorbs any remaining traces of water and the dry gas passes out through the line 23 and valve 24 to the dry gas outlet line 21. The blower 54 through its inlet connection 53 withdraws a small percentage of this dry and pure gas and forces it through the line 55, branch 60 and valve 61 into the inlet of the absorber C. This dry, pure gas drives any unprocessed gas from the absorber C and forces it through the line 31, line 32, valve 33, line 28 and line 17 into the cooler and condenser 22. The cooled gas passes out through the line 39, valve 40, line 48, line 51, valve 52 and line 49 to the inlet of the absorber A where it mingles with the raw or unprocessed gas and is carried through the absorbers in the manner described.

*Ninth operation cooling absorber C—Fig. 9*

As soon as all remaining traces of wet or unprocessed carbon dioxide gas have been driven out of absorber C and its outlet piping system the blower 54 is turned off and the valves adjusted so that the gas entering through the inlet line 1, water scrubber 2, compressor and after cooler 3 and heater 4 pass through the line 6, valve 8 and branch 7 directly into the bottom of the partly spent absorber A. In this absorber the greater part of the moisture is adsorbed and the partly dried gas passes out through the line 16, line 34, valve 35, and line 36 directly into the inlet of the freshly reactivated absorber B. Any remaining traces of moisture are adsorbed by passing through the bed of freshly reactivated alumina in this absorber B and the dry and pure gas leaves this absorber through the line 25, line 43, valve 44 and line 45 directly to the bottom or inlet of the absorber C. In passing through the bed of alumina in this absorber C it cools the bed from 300° to 400° F. to 100° F. and the gas is heated and passes out through line 31, valve 33, lines 32, 28 and 17 into the cooler and condenser 22 where it is cooled. The cooled, dry and pure gas then passes out from the cooler and condenser 22 through the line 39, valve 42 and line 41 directly into the dry gas outlet line 21.

At the end of this operation the absorber A is spent or dead, the absorber B is partly spent and the absorber C is freshly reactivated. Therefore the apparatus is in the condition assumed in the beginning of the cycle of operations and the process can be continued.

It will be noted that during the purging operation the dry gas employed for purging is simultaneously delivered with wet gas into the absorber B and finally back into the dry gas line and that there is no change in the rate of flow of dry gas from the system, the absorbers and the cooler and condenser 22 with all connecting piping are thus purged of all gas containing any moisture and this purging is done only with the same gas after it has been dehydrated thus eliminating any possible contamination of the dry gas by moisture or from the use of a gas of any other kind or character than the pure, dehydrated gas which is the product of the system. Only a small portion, say five to fifteen percent of the total dry gas outlet is required for this purging operation as it is almost entirely a gas displacement operation and does not require a long time, the time consumed for the purging operation being about 2% of the period for reactivating, purging and cooling any absorber.

The cooling operation also consumes but a comparatively small amount of time this being from 4 to 8% of the time of each period. Also since the lower portion of the adsorbent bed is cooled almost immediately, the cooled adsorbent begins to act as a third absorber in series with the other two thus further assuring that the gas will be completely dehydrated toward the end of the period when the first absorber in the series is well saturated and the intermediate absorber is partly so. This is an important point since as the first two absorbers lose in efficiency the third gains in efficiency during the cooling operation and completely insures that no moist gas will enter the dry gas produced by the system. This permits the first absorber in the series during the cooling operation to be run longer and adsorb more moisture though by so operating it will be less efficient as an absorber. Another important result in the present process and system is that by compressing the wet gas from say normal atmospheric to ninety pounds absolute pressure the volume of gas is reduced to one-sixth the original. If this gas after having been compressed is cooled to its original temperature before compressing, five-sixths of the moisture will have been condensed out, this leaving only one-sixth as much water vapor to be removed and requiring only the same relative amount of adsorbent material and size of adsorbers. Also the size of all distributing piping will be reduced and the cost of the system also decreased, for while the weight of the gas handled remains the same the volume has been greatly reduced and a smaller pipe will carry the same weight of gas per unit of time with the same friction loss. This is due to the fact that friction to the flow of gases goes up as the square root of the density while the weight of the gases increases directly as the density.

It is obvious that the illustration of the invention is diagrammatic and that instead of all the individual valves shown, these could be diaphragm valves operated from suitable master valves or master control means thereby greatly simplifying the operation of the device. The words adsorber and absorber and the like as used herein are also to be understood as being used interchangeably, the word absorber as used in the claims being intended to comprehend the use of adsorbers.

The important advantages of the present system are summarized as follows:

1. Compressing and cooling gas before passing into the system for adsorption of impurities greatly reduces the amount of impurities to be removed, thereby permitting less adsorbent material to be employed and proportionately reducing the size of all equipment and piping.

2. Purging the parts of equipment previously containing impure gas and doing this purging with pure gas processed by the system completely assures freedom from contamination of the final pure gas by any impurities or by a kind of gas other than that being processed.

3. Reactivating with the raw, untreated gas in advance of and as a previous step to a subsequent purification and the cooling to its original temperature and the extraction of the impurities it has picked up in reactivating an absorber results in the raw gas entering the absorbers for purification in the same condition as though it had not been used for reactivation.

4. The purging by the processed gas produced by the system and reactivating with raw, untreated gas assure a constant flow at the outlet of the system of purified gas at all times and since the same gas is employed exclusively for all of these operations there is no contamination of the system by the introduction of a foreign gas in the system.

While I have shown a particular form of system and described it as being used in connection with activated alumina as an adsorbent and in processing carbon dioxide gas it will be understood that the system is applicable to the treatment of any fluid with any form of adsorbent or absorbent and that the system can be varied widely without departing from the spirit and scope of the accompanying claims.

I claim as my invention:

1. In a process of the character described, the steps consisting in treating the fluid to be purified to convert it into a purifying agent passing said purifying fluid through a spent absorber in contact with the absorbent therein, subsequently removing a portion of the impurities from said fluid and restoring it to its original character and then passing said fluid through a second absorber where its remaining impurities are removed.

2. In a process of the character described, the steps consisting in treating the fluid to be purified to convert it into a purifying agent, passing said purifying fluid through a spent absorber in contact with the absorbent therein, whereby said purifying fluid becomes mixed with the impurities driven off from said adsorbent subsequently removing a portion of the impurities from said mixed fluid and restoring it to its original character and then passing said fluid through a second absorber where its remaining impurities are removed and subsequently reversing the absorbers in point of position in the system when said active absorber is spent and said spent absorber is reactivated.

3. In a process of the character described, the steps consisting in passing the fluid to be purified through an active absorber to remove its impurities, reactivating a spent absorber, purging said reactivated absorber by passing the purified fluid through said reactivated absorber, passing said purging fluid through said active absorber and reversing the absorbers in point of position in the system as they alternately become spent and reactivated.

4. In a process of the character described, the steps consisting in treating the fluid to be purified to convert it into a purifying agent, passing said purifying fluid through a spent absorber to reactivate said spent absorber whereby said spent absorber becomes a reactivated absorber, subsequently removing a portion of the impurities from said fluid and restoring it to its original character, passing said fluid through an active absorber where its remaining impurities are removed, subsequently cutting off the flow of purifying fluid through said reactivated absorber, passing the untreated fluid through said active absorber, withdrawing a portion of the purified fluid and passing it through said reactivated absorber to purge said reactivated absorber and discharging said purging fluid through said active absorber and reversing the absorbers in point of position in the system as they alternately become spent and reactivated.

5. In a process of the character described, the steps consisting in heating the fluid to be purified, passing said heated fluid through a spent absorber to drive off the impurities and reactive the spent absorber, subsequently cooling said fluid and condensing out a part of the impurities therein, passing said cooled fluid through an active absorber to remove the remaining impurities therein, cutting off the flow of heated fluid through said spent absorber after it has been reactivated, passing said fluid unheated through said active absorber to remove the impurities in said fluid and subsequently passing the purified fluid from said active absorber through said reactivated absorber to cool said reactivated absorber and reversing the absorbers in point of position in the system as they alternately become spent and reactivated.

6. In a process for use in a fluid purification system having at least three absorbers, one of which is spent, the intermediate one of which is partly spent and the third active, the steps which consist in treating the fluid to convert it into a purifying agent, passing said purifying fluid through said spent absorber to reactivate said spent absorber by removing the impurities in said spent absorber, restoring the said purifying fluid from said spent absorber to its original character, and removing a part of the impurities therein, passing said restored fluid successively through said partly spent and active absorbers to remove the remaining impurities therein, cutting off the flow of treated fluid to said spent absorber after it has been reactivated and passing the fluid untreated directly through said partly spent and active absorbers to remove the impurities from said fluid, withdrawing a portion of the purified fluid from said system and passing it through said reactivated absorber to purge it of any impure fluid, passing said purging gas through at least one of the other absorbers, subsequently passing the purified fluid from said operative absorbers through said reactivated and purged absorber to restore it to its proper operating temperature and successively advancing the absorbers in point of position in the system as they become successively spent, partly spent and reactivated.

7. In a fluid purification process of the character described, in a system having three absorbers, one of which is spent, the other partly spent and the third active, the steps comprising heating the raw fluid to be purified to a relatively high temperature, passing said heated fluid through said spent absorber to drive off the impurities absorbed by said spent absorber, subsequently cooling the fluid and condensing a part of its impurities, passing said cooled fluid successively through said partly spent and active absorbers to remove the remaining impurities from said fluid, cutting off the flow of hot fluid to said spent absorber after said spent absorber has been reactivated, passing the raw unheated fluid directly through said partly spent and active absorbers whereby all impurities are removed from said fluid, withdrawing a portion of the purified fluid and passing it through said reactivated absorber to purge it of any impure fluid remaining therein, cooling said purging fluid on leaving said reactivated absorber and returning it through at least one of the other absorbers, cutting off said purging fluid, subsequently passing the purified fluid from the other absorbers through said reactivated absorber to cool it, said reactivated absorber becoming active immediately following the commencement of its cooling and in its position at the tail end of the flow of gas insuring the complete purification and changing said absorbers in point of position in the system as they become successively spent, partly spent and reactivated to secure a continuous flow of a constant quantity of purified fluid.

8. The method of separating a vapor from a mixture of gas and vapor comprising first heating the mixture, then passing the heated mixture through adsorbent containing adsorbed vapor to enrich the mixture and activate the adsorbent, then cooling the mixture, then separating the condensate therefrom, finally passing the mixture through adsorbent to remove remaining vapor, and periodically reversing the position of the adsorbents in the cycle.

9. The method of separating a vapor from a mixture of gas and vapor comprising first lowering the relative humidity of the gas, then contacting the gas and a batch of adsorbent containing adsorbed vapor to raise the relative humidity of the gas and to activate the adsorbent, then lowering the temperature of the mixture below the dew point, then separating the condensate, finally contacting the mixture with a batch of unsaturated adsorbent to remove remaining vapor, and periodically exchanging the positions of the batches of adsorbent.

10. The method of removing a condensible from a gaseous mixture comprising first lowering the relative humidity of the mixture, then increasing the absolute humidity by contact with adsorbent containing the condensible, then lowering the temperature below the dew point and removing the condensate, finally further reducing the absolute humidity by contact with unsaturated adsorbent, and then reversing the order of flow over the adsorbents.

11. The method of removing a condensible from a gaseous mixture comprising bringing the mixture into heat exchanging relation to heating means, contacting the heated mixture and a partially saturated adsorbent, cooling the enriched mixture to precipitate a portion of the condensible, removing the condensate, contacting the cooled mixture and active adsorbent, delivering the stripped gaseous residue, removing the heating means from the circuit to cool the first mentioned adsorbent, and then transferring the positions of the adsorbents in the circuit and returning the heating means to the circuit.

12. The method of removing a condensible from a gaseous mixture comprising passing the mixture successively into direct contact with two batches of adsorbent, first conditioning the mixture to activate one batch and to charge the other with the condensible, removing the condensible from the mixture in passing between batches, and periodically reversing the positions of the batches in the circuit.

13. The method of drying a gas consisting in heating the gas to be dried, passing the heated gas in direct contact with a mass of porous solid adsorbent that has become charged with water in drying gas in a previous cycle to activate the adsorbent, cooling the effluent mixture to precipitate some of the moisture, separating the condensate from the gas, then passing the gas through a second mass of activated porous solid adsorbent to remove the remaining moisture and periodically reversing the position of the masses of adsorbent in the cycle.

CLAUDE A. BULKELEY.